(12) United States Patent
Lesner et al.

(10) Patent No.: US 10,009,139 B1
(45) Date of Patent: *Jun. 26, 2018

(54) PEER-TO-PEER PROXIMITY PAIRING OF ELECTRONIC DEVICES WITH CAMERAS AND SEE-THROUGH HEADS-UP DISPLAYS

(71) Applicant: INTUIT INC., Mountain View, CA (US)

(72) Inventors: Christopher Z. Lesner, Palo Alto, CA (US); Alexander S. Ran, Palo Alto, CA (US)

(73) Assignee: Intuit inc., Mountain View, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/206,788

(22) Filed: Jul. 11, 2016

Related U.S. Application Data

(63) Continuation of application No. 14/309,000, filed on Jun. 19, 2014, now Pat. No. 9,392,637.

(51) Int. Cl.
| | |
|---|---|
| *H04B 7/00* | (2006.01) |
| *H04K 1/00* | (2006.01) |
| *H04W 76/02* | (2009.01) |
| *H04L 29/06* | (2006.01) |
| *H04L 9/30* | (2006.01) |
| *G02B 27/01* | (2006.01) |
| *H04W 76/14* | (2018.01) |
| *H04W 84/18* | (2009.01) |

(52) U.S. Cl.
CPC ............ *H04K 1/00* (2013.01); *G02B 27/017* (2013.01); *H04L 9/30* (2013.01); *H04L 63/0428* (2013.01); *H04W 76/023* (2013.01); *H04W 76/14* (2018.02); *G02B 2027/0138* (2013.01); *H04L 2209/805* (2013.01)

(58) Field of Classification Search
CPC ..... H04W 12/02; H04W 12/04; H04W 12/06; H04L 63/08
USPC ................. 455/41.1–41.3, 410–411
See application file for complete search history.

(56) References Cited

U.S. PATENT DOCUMENTS

| | | | |
|---|---|---|---|
| 7,174,130 B2 | 2/2007 | Kurisko et al. | |
| 9,392,637 B1 * | 7/2016 | Lesner | ............... H04L 63/0823 |
| 2014/0281547 A1 | 9/2014 | Modzelewski et al. | |

* cited by examiner

*Primary Examiner* — Lee Nguyen
(74) *Attorney, Agent, or Firm* — Patterson + Sheridan, LLP

(57) ABSTRACT

The disclosed embodiments relate to electronic devices with optical head-mounted displays (OHMDs). Each electronic device includes an OHMD that provides a heads-up display (HUD) and one or more sensors. The electronic device also includes a pairing apparatus that uses the OHMD to generate a first signal that is detectable by the other electronic device. The pairing apparatus also uses the OHMD to detect a second signal from a second OHMD at the other electronic device. Next, the pairing apparatus generates a shared secret with the second electronic device using data associated with the first and second signals and uses the shared secret to establish a secure connection with the second electronic device.

20 Claims, 4 Drawing Sheets

PEER-TO-PEER PROXIMITY PAIRING OF ELECTRONIC DEVICES WITH CAMERAS AND SEE-THROUGH HEADS-UP DISPLAYS

RELATED ART

The disclosed embodiments relate to electronic devices with optical head-mounted displays (OHMDs). More specifically, the disclosed embodiments relate to techniques for performing peer-to-peer proximity pairing of electronic devices with cameras and see-through heads-up displays.

BACKGROUND

Because of their small size and computing capabilities, portable electronic devices are becoming increasingly popular. Recently, engineers have continued this trend by incorporating the capabilities of a portable electronic device (such as a cellular telephone) in a head-mounted electronic device such as an OHMD. The OHMD may include a heads-up display (HUD) that seamlessly provides information about the environment around the head-mounted electronic device, as well as an imaging sensor that acquires information about the environment. In addition, the head-mounted electronic device may be capable of communicating with other electronic devices, such as other head-mounted electronic devices and/or OHMDs. For example, the head-mounted electronic device may be capable of exchanging information with another head-mounted electronic device through wireless communications when two individuals wearing the head-mounted electronic devices are proximate to each other.

It can be difficult to securely pair head-mounted electronic devices, especially in a crowded environment containing multiple head-mounted electronic devices. In particular, because the head-mounted electronic device is hands-free, it may be difficult for a user to manually provide information necessary to identify the peer electronic device. However, verbally providing the authentication information may create a security risk because this information may be overhead by a third party and subsequently used for a replay attack or otherwise interfered with by the third party.

Thus, secure communications between pairs of head-mounted electronic devices may be facilitated by mechanisms for pairing head-mounted electronic devices in proximity to one another without requiring manual input by users of the head-mounted electronic devices.

SUMMARY

The disclosed embodiments relate to electronic devices with optical head-mounted displays (OHMDs). Each electronic device includes an OHMD that provides a heads-up display (HUD) and one or more sensors. The electronic device also includes a pairing apparatus that uses the OHMD to generate a first signal that is detectable by the other electronic device. The pairing apparatus also uses the OHMD to detect a second signal from a second OHMD at the other electronic device. Next, the pairing apparatus generates a shared secret with the second electronic device using data associated with the first and second signals and uses the shared secret to establish a secure connection with the second electronic device.

In some embodiments, the pairing apparatus also detects, at the first electronic device, initiation of the communication between the first and second electronic devices prior to generating the first signal.

In some embodiments, initiation of the communication includes at least one of:
 (i) the second signal;
 (ii) the proximity of the second electronic device to the first electronic device;
 (iii) an alignment of the first and second OHMDs; and
 (iv) a user command from the user of the first electronic device.

In some embodiments, the data associated with the first and second signals includes at least one of a cryptographic key, a number, and addressing information.

In some embodiments, the secure connection includes at least one of a peer-to-peer connection and an infrastructure connection.

In some embodiments, the first and second signals include optical signals.

In some embodiments, the optical signals include at least one of a series of flashes, one or more colors, and one or more shapes.

In some embodiments, the optical signals are produced by at least one of heads-up displays (HUDs) on the first and second OHMDs and one or more additional optical sources on the first and second OHMDs.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The disclosed embodiments provide a method and system for facilitating communication between two electronic devices. More specifically, the disclosed embodiments provide a method and system for peer-to-peer proximity pairing of electronic devices using optical head-mounted displays (OHMDs). OHMDs in a pair of electronic devices in proximity to one another may be used to generate signals, such as optical signals, that are detected by one another. The detected signals may be used by both electronic devices to establish a shared secret, and the shared secret may be used to establish a secure connection between the electronic devices.

Figure 1:
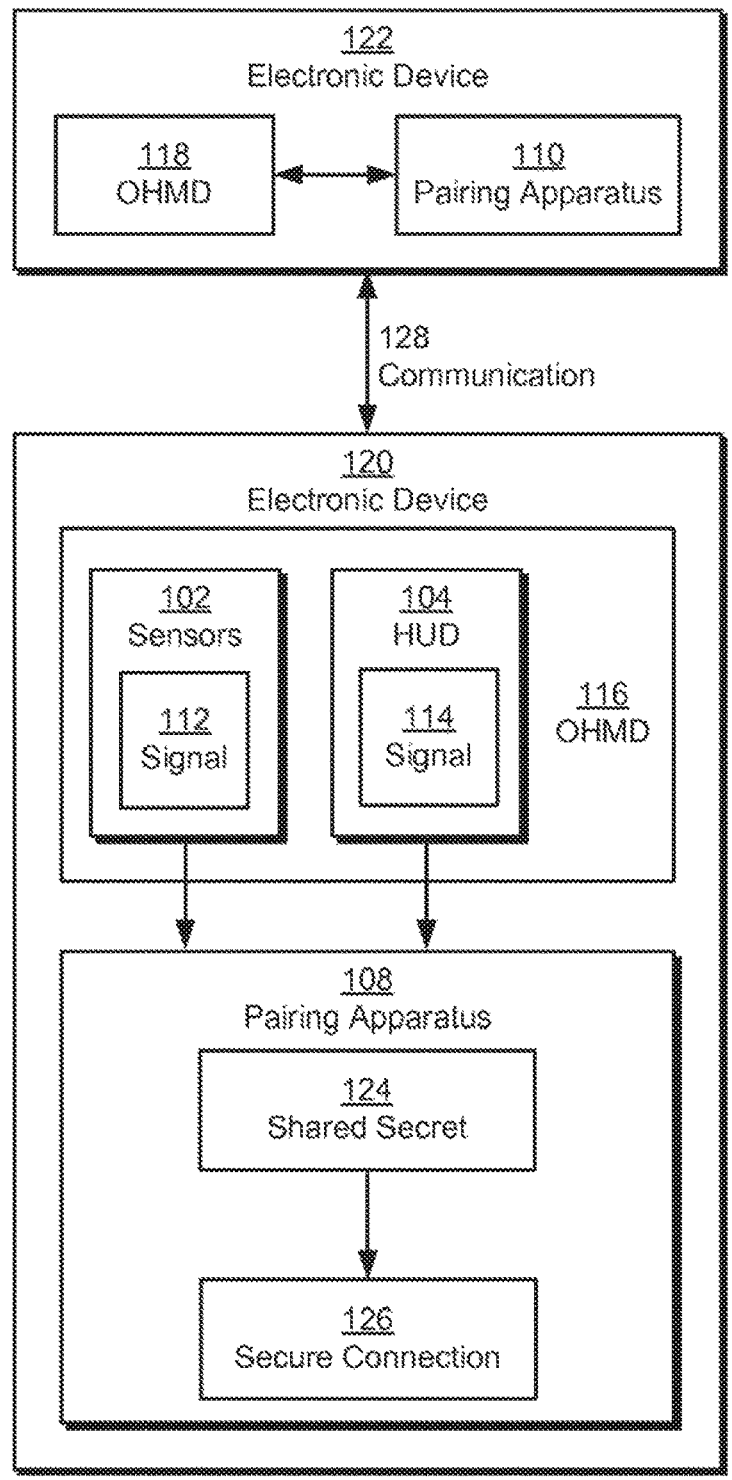
FIG. 1 shows a system for facilitating communication between two electronic devices in accordance with the disclosed embodiments.

FIG. 1 shows a system for facilitating communication 128 between two electronic devices 120-122 in accordance with the disclosed embodiments. More specifically, FIG. 1 shows a system for performing peer-to-peer proximity pairing of electronic devices 120-122 using OHMDs 116-118 of electronic devices 120-122.

OHMDs 116-118 may be worn by users as head-mounted displays, helmet-mounted displays, and/or contact lenses. As shown in FIG. 1, OHMD 116 may include a heads-up display (HUD) 104 and one or more sensors 102 such as a camera, microphone, accelerometer, gyroscope, Global Positioning System (GPS) receiver, magnetometer, proximity sensor, and/or ambient light sensor. OHMD 118 may include similar components, which are not shown in FIG. 1.

In one or more embodiments, communication 128 between electronic devices 120-122 is facilitated using a secure connection 126 with one another. For example, users of electronic devices 120-122 may use secure connection 126 to exchange personal information, contact information, social networking information (e.g., common friends), documents, images, audio, video, payment information, scheduling information, and/or files with one another. To provide secure connection 126, each electronic device 120-122 may encrypt data before transmitting the data to the other electronic device and decrypt data received from the other electronic device to enable use of the data by a user of the electronic device. Such encryption and decryption of data may allow electronic devices 120-122 to exchange and use the data while preventing a third-party eavesdropper from accessing the data.

Prior to establishing secure connection 126, one or both electronic devices 120-122 may detect the initiation of communication 128 between electronic devices 120-122. Such initiation of communication 128 may be performed in a number of ways. For example, one or more sensors 102 (e.g., camera, microphone, infrared sensor, etc.) on electronic device 120 may detect initiation of communication 128 as a signal (e.g., signal 112) from electronic device 122. Initiation of communication 128 may also be represented by the proximity of electronic device 122 to electronic device 120, as detected by the same sensors 102 and/or different sensors on electronic device 120. Communication 128 may further be initiated by aligning OHMDs 116-118 so that a signal-generation mechanism (e.g., HUD 104) on OHMD 116 is in the line of sight of a camera and/or other sensors on OHMD 118 and a signal-generation mechanism on OHMD 118 is in the line of sight of a camera and/or other sensors 102 on OHMD 116. Finally, communication 128 may be initiated using a user command, such as a voice command or gesture, from a user of electronic device 120. Electronic device 122 may include similar mechanisms for detecting the initiation of communication 128.

Once initiation of communication 128 is detected, electronic devices 120-122 may undergo a pairing process for establishing secure connection 126. During the pairing process, electronic devices 120-122 may identify one another and exchange data that is subsequently used to establish secure connection 126.

In particular, electronic device 120 may use HUD 104 and/or another signal source on OHMD 116 to generate a signal 114 that is detectable by electronic device 122. At the same time, electronic device 120 may use a camera and/or other sensors 102 to detect another signal 112 from a signal source on OHMD 118. Similarly, electronic device 122 may include functionality to detect signal 114 from electronic device 120 and generate signal 112 for detection by electronic device 120.

In one or more embodiments, signals 112-114 are optical signals that are produced by HUDs (e.g., HUD 104) on electronic devices 120-122. Signals 112-114 may also be produced by other optical sources, such as light-emitting diodes (LEDs), in lieu of or in addition to optical signals generated by the HUDs of electronic devices 120-122. Information may be transmitted in signals 112-114 as a series of flashes, one or more colors, and/or one or more shapes. For example, electronic devices 120-122 may emit timed flashes that encode numeric or binary information, a series of colors that represent different hexadecimal digits, and/or shapes that represent encoded alphanumeric symbols. As a result, optical signals (e.g., signals 112-114) may be generated by electronic devices 120-122 and/or OHMDs 116-118 so that information can be extracted from signals 112-114 even if the optical sources of the signals are small, low-resolution, and/or relatively far (e.g., several feet) away from sensors (e.g., sensors 102) used to detect the signals.

After electronic devices 120-122 have generated and detected signals 112-114 from one other, pairing apparatuses 108-110 on electronic devices 120-122 may use data associated with signals 112-114 to generate a shared secret 124. For example, electronic devices 120-122 may use signals 112-114 to exchange cryptographic keys (e.g., public keys), numbers (e.g., for use in subsequent key exchange and/or to verify pairing with another electronic device), and/or addressing information (e.g., Media Access Control (MAC) addresses). Because electronic devices 120-122 may require proximity, line-of-sight, and/or alignment with one another to pair, key exchange may not be necessary to securely pair electronic devices 120-122.

Shared secret 124 may then be used to establish secure connection 126 between electronic devices 120-122. For example, electronic devices 120-122 may use radios on electronic devices 120-122 to establish a secure peer-to-peer connection with one another using WiFi, Bluetooth (Bluetooth™ is a registered trademark of Bluetooth SIG, Inc.), near field communication (NFC), and/or other types of wireless technology standards. Alternatively, secure connection 126 may be an infrastructure connection, such as a connection with a wireless local area network (WLAN) and/or a cellular connection that is accessed by tethering electronic devices 120-122 to other electronic devices (e.g., mobile phones, mobile hotspots, tablet computers, etc.) with cellular capabilities. Once secure connection 126 is established, electronic devices 120-122 may use secure connection 126 to perform additional communication 128 with one another.

Consequently, OHMDs 116-118 and pairing apparatuses 108-110 may enable peer-to-peer proximity pairing of electronic devices 120-122 without requiring manual input from users of electronic devices 120-122 and/or external devices. For example, alignment of OHMDs 116-118 and/or proximity of electronic devices 120-122 to one another (e.g., within a pre-specified radius) may trigger pairing of electronic devices 120-122, thus removing the requirement that users of electronic devices 120-122 must provide commands or gestures to pair electronic devices 120-122. Moreover, the use of existing components on OHMDs 116-118, such as HUD 104 and/or sensors 102, to generate and detect signals 112-114 for pairing electronic devices 120-122 may allow electronic devices 120-122 to complete the pairing process without communicating with the users, a shared server, and/or other external pairing devices or mechanisms.

Figure 2:
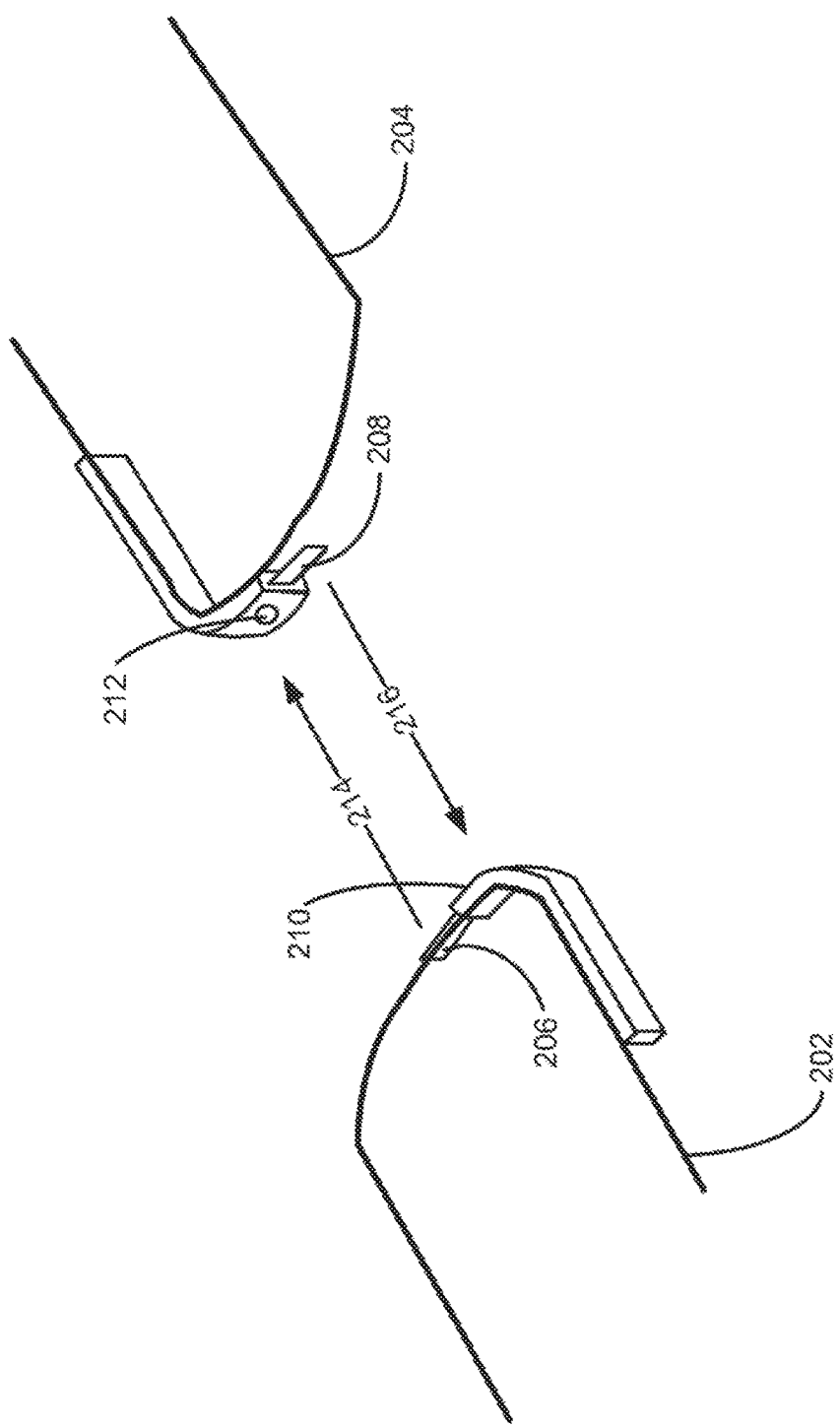
FIG. 2 shows an exemplary peer-to-peer proximity pairing of two electronic devices in accordance with the disclosed embodiments.

FIG. 2 shows an exemplary peer-to-peer proximity pairing of two electronic devices 202-204 in accordance with the disclosed embodiments. As shown in FIG. 2, electronic devices 202-204 include OHMDs that may be worn by users of electronic devices 202-204. Each OHMD may provide a HUD 206-208 and a camera 210-212 that allow electronic devices 202-204 to obtain information related to the users' environments and provide visual output to the users in a "hands-free" manner.

Because electronic devices 202-204 are designed to be hands-free, requiring manual input during pairing of electronic devices 202-204 may be inconvenient and/or time-consuming to the users. To facilitate communication and/or information exchange between the users of electronic devices 202-204, electronic devices 202-204 may perform peer-to-peer proximity pairing with one another using HUDs 206-208 and cameras 210-212 instead of input (e.g., commands, gestures, etc.) from the users.

In particular, electronic devices 202-204 may be aligned so that a signal 214 generated by HUD 206 and/or another optical source on electronic device 202 is detected by camera 212 and/or another sensor on electronic device 204. Electronic devices 202-204 may further be aligned so that another signal 216 from HUD 208 and/or another optical source on electronic device 204 is detected by camera 210 and/or another sensor on electronic device 202. For example, electronic devices 202-204 may be aligned so that HUD 206 is within the line of sight of camera 212 and HUD 208 is within the line of sight of camera 210. Alternatively, pairing of electronic devices 202-204 may require stricter alignment of cameras 210-212 and HUDs 206-208, such that HUDs 206-208 take up a minimum amount of space in the fields of view of the opposite cameras 210-212.

Signals 214-216 may be used by electronic devices 202-204 to generate a shared secret that is used to establish a secure connection between electronic devices 202-204. For example, electronic device 202 may encode a number in signal 214 and generate signal 214 as a series of flashes that can be detected by camera 212. Electronic device 204 may confirm receipt of the number by extracting the number from signal 214, encoding the number in signal 216, and generating signal 216 as a separate series of flashes that can be detected by camera 210. Electronic devices 202-204 may then use the number to establish the secure connection over WiFi, Bluetooth, NFC, a cellular network, and/or other type of wireless peer-to-peer connection or infrastructure connection. Prior to establishing the secure connection, electronic devices 202-204 may optionally use signals 214-216 to exchange cryptographic keys, addressing information, and/or other information that facilitates secure communication between electronic devices 202-204.

Figure 3:
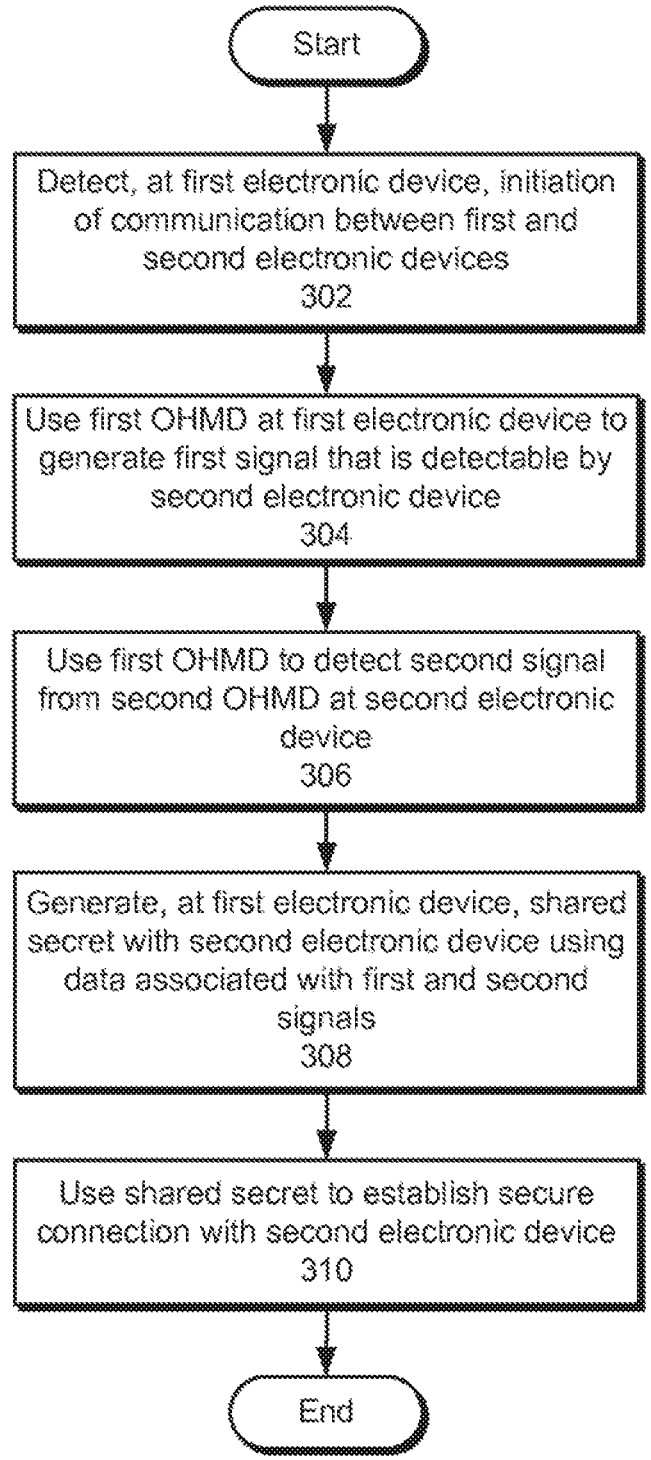
FIG. 3 shows a flowchart illustrating the process of facilitating communication between a first electronic device and a second electronic device in proximity to the first electronic device in accordance with the disclosed embodiments.

FIG. 3 shows a flowchart illustrating the process of facilitating communication between a first electronic device and a second electronic device in proximity to the first electronic device in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, initiation of communication between the first and second electronic devices is detected at the first electronic device (operation 302). The initiated communication may be detected as a signal from the second device, the proximity of the second electronic device to the first electronic device, an alignment of OHMDs on the electronic devices, and/or an optional user command (e.g., voice command, gesture, etc.) from the user of the first electronic device.

Next, a first OHMD at the first electronic device is used to generate a first signal that is detectable by the second electronic device (operation 304) and detect a second signal from a second OHMD at the second electronic device (operation 306). For example, an HUD and/or other optical source in the first OHMD may generate an optical signal as a series of flashes, one or more colors, and/or one or more shapes that can be detected by a camera and/or other sensor on the second OHMD. At the same time, a camera and/or other sensor on the first OHMD may be used to detect the second signal (e.g., the same signal used to initiate communication between the electronic devices) as a series of flashes, one or more colors, and/or one or more shapes from an HUD and/or other optical source on the second OHMD.

Those skilled in the art will appreciate that a variety of signals may be generated and detected using OHMDs on the electronic devices. For example, the electronic devices may use existing components on the OHMDs to generate and detect directional signals, such as infrared signals and/or other types of signals that can be used to establish secure communication between the electronic devices.

After the first signal is generated and the second signal is detected by the first electronic device, a shared secret with the second electronic device is generated at the first electronic device using data associated with the first and second signals (operation 308). Finally, the shared secret is used to establish a secure connection with the second electronic device (operation 310).

For example, the first electronic device may use data from the first and second electronic signals to establish a symmetric key, which is subsequently used to secure communication between the electronic devices. Alternatively, the first electronic device may use the first signal to transmit a first public key to the second electronic device and use the second signal to receive a second public key from the second electronic device. The first electronic device may subsequently use the second public key to encrypt data before transmitting the data to the second electronic device over a peer-to-peer or infrastructure connection with the second electronic device. The encrypted data may be received by the second electronic device and decrypted using a private key corresponding to the second public key. Along the same lines, data received from the second electronic device over the same peer-to-peer or infrastructure connection may be encrypted using the first public key and decrypted by the first electronic device using the corresponding private key.

Figure 4:
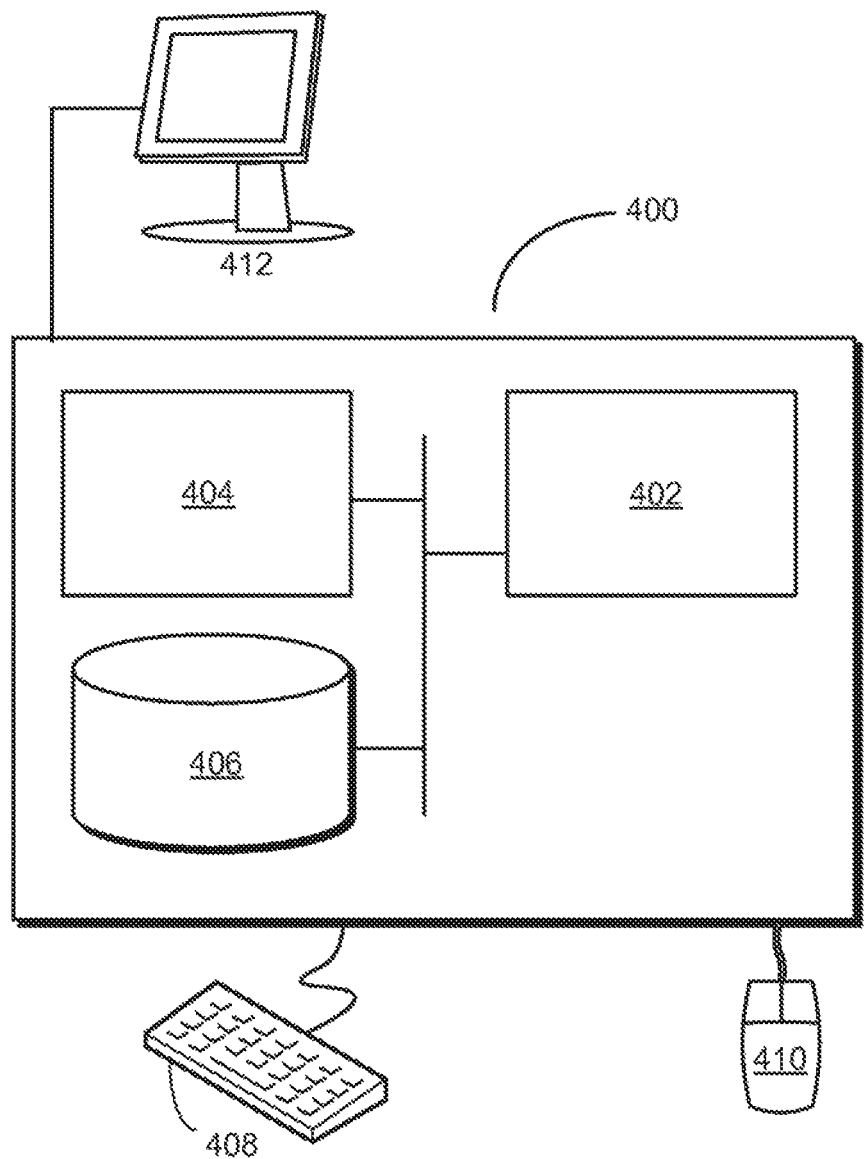
FIG. 4 shows a computer system in accordance with the disclosed embodiments.

FIG. 4 shows a computer system 400 in accordance with an embodiment. Computer system 400 may correspond to an apparatus that includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as one or more sensors, a keyboard 408, a mouse 410, and a display 412 (e.g., a heads-up display).

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for facilitating communication between an electronic device (e.g., computer system 400) and another electronic device in proximity to the electronic device. The system may include an optical head-mounted display (OHMD) that provides a heads-up display (HUD) and one or more sensors. The system may also include a pairing apparatus that uses the OHMD to generate a first signal that is detectable by the other electronic device. The pairing apparatus may also use the OHMD to detect a second signal from a second OHMD at the other electronic device. Next, the pairing apparatus may generate a shared secret with the second electronic device using data associated with the first and second signals. Finally, the pairing apparatus may use the shared secret to establish a secure connection with the second electronic device.

In addition, one or more components of computer system 400 may be remotely located and connected to the other components over a network. Portions of the present embodiments (e.g., electronic devices, OHMDs, pairing apparatuses, etc.) may also be located on different nodes of a distributed system that implements the embodiments. For example, the present embodiments may be implemented using a cloud computing system that facilitates communication between pairs of remote electronic devices by pairing the remote electronic devices using signals generated and detected by the remote electronic devices.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for establishing a secure connection between a first electronic device and a second electronic device, comprising:
    generating, by the first electronic device on a first optical head-mounted display (OHMD), a first signal that is detectable by the second electronic device;
    detecting, by the first electronic device, a second signal, the second signal broadcast from the second electronic device on a second OHMD;
    transmitting a first communication from the first electronic device to the second electronic device, wherein the first communication is encrypted with data from the second signal;
    receiving a second communication from the second electronic device at the first electronic device, wherein the second communication is encrypted with data from the first signal; and
    decrypting the second communication at the first electronic device.

2. The computer-implemented method of claim 1, wherein the data from the first signal comprises a first public cryptographic key, and the data from the second signal comprises a second public cryptographic key.

3. The computer-implemented method of claim 2, wherein the second communication, encrypted with the first public cryptographic key, is decrypted at the first electronic device with a first private cryptographic key corresponding to the first public cryptographic key.

4. The computer-implemented method of claim 3, wherein additional communication transmitted from the first electronic device to the second electronic device is encrypted with the second public cryptographic key; and
    wherein additional communication received from the second electronic device at the first electronic device is encrypted with the first public cryptographic key and decrypted with the first private cryptographic key.

5. The computer-implemented method of claim 1, wherein the first communication is additionally encrypted with data from the first signal; and
    wherein the second communication is additionally encrypted with data from the second signal.

6. The computer-implemented method of claim 5, wherein the data from the first and second signals encrypting the first communication is the same data from the first and second signals encrypting the second communication; and
    wherein the data from the first and second signals encrypting both the first and second communications comprises a symmetric key.

7. The computer-implemented method of claim 6, wherein the second communication is decrypted with the symmetric key.

8. The computer-implemented method of claim 7, wherein additional communication transmitted from the first electronic device to the second electronic device is encrypted with the symmetric key; and
    wherein additional communication received from the second electronic device at the first electronic device is encrypted and decrypted with the symmetric key.

9. The computer-implemented method of claim 1, wherein the secure connection comprises at least one of:
    a peer-to-peer connection; and
    an infrastructure connection.

10. An electronic device, comprising:
    a first optical head-mounted display (OHMD), comprising:
        a heads-up display (HUD); and
        one or more sensors; and
    a pairing apparatus configured to:
        generate, by the first OHMD, a first signal that is detectable by another electronic device;
        detect, by the one or more sensors, a second signal, the second signal broadcast from the other electronic device on a second OHMD;

transmit a first communication to the other electronic device, wherein the first communication is encrypted with data from the second signal;

receive a second communication from the other electronic device, wherein the second communication is encrypted with data from the first signal; and decrypt the second communication.

11. The electronic device of claim 10, wherein the data from the first signal encrypting the second communication comprises a first public cryptographic key, and the data from the second signal encrypting the first communication comprises a second public cryptographic key.

12. The electronic device of claim 11, wherein the second communication, encrypted with the first public cryptographic key, is decrypted with a first private cryptographic key corresponding to the first public cryptographic key.

13. The electronic device of claim 10, wherein the first communication is additionally encrypted with data from the first signal; and wherein the second communication is additionally encrypted with data from the second signal.

14. The electronic device of claim 13, wherein the data from the first and second signals encrypting the first communication is the same data from the first and second signals encrypting the second communication; and wherein the data from the first and second signals encrypting both the first and second communications comprises a symmetric key.

15. The electronic device of claim 14, wherein the second communication is decrypted with the symmetric key.

16. A non-transitory computer-readable storage medium storing instructions that when executed by a computer cause the computer to perform a method for establishing a secure connection between a first electronic device and a second electronic device, the method comprising:

generating, by the first electronic device on a first optical head-mounted display (OHMD), a first signal that is detectable by the second electronic device;

detecting, by the first electronic device, a second signal, the second signal broadcast from the second electronic device on a second OHMD;

transmitting a first communication from the first electronic device to the second electronic device, wherein the first communication is encrypted with data from the second signal;

receiving a second communication from the second electronic device at the first electronic device, wherein the second communication is encrypted with data from the first signal; and decrypting the second communication at the first electronic device.

17. The non-transitory computer-readable storage medium of claim 16, wherein the data from the first signal comprises a first public cryptographic key, and the data from the second signal comprises a second public cryptographic key.

18. The non-transitory computer-readable storage medium of claim 17, wherein the second communication, encrypted with the first public cryptographic key, is decrypted at the first electronic device with a first private cryptographic key corresponding to the first public cryptographic key.

19. The non-transitory computer-readable storage medium of claim 16, wherein the first communication is additionally encrypted with data from the first signal; and wherein the second communication is additionally encrypted with data from the second signal.

20. The non-transitory computer-readable storage medium of claim 19, wherein the data from the first and second signals encrypting the first communication is the same data from the first and second signals encrypting the second communication; and wherein the data from the first and second signals encrypting both the first and second communications comprises a symmetric key.

* * * * *